Patented Jan. 1, 1929.

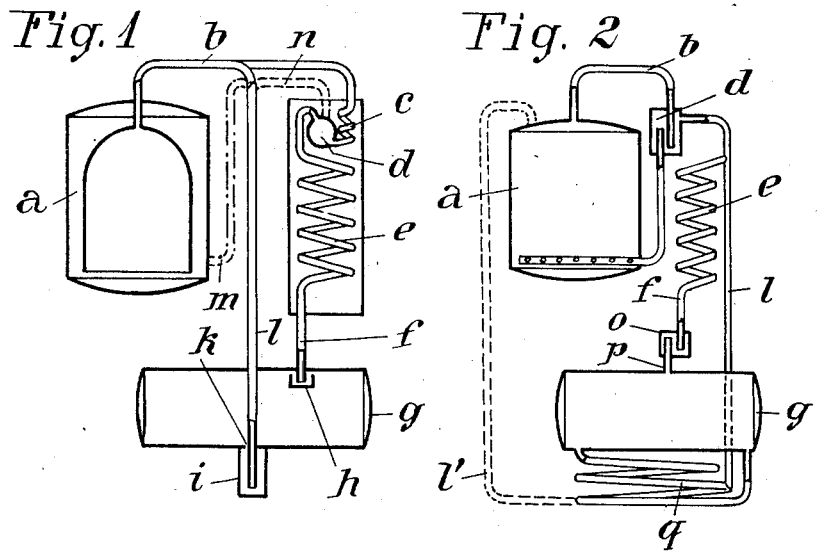
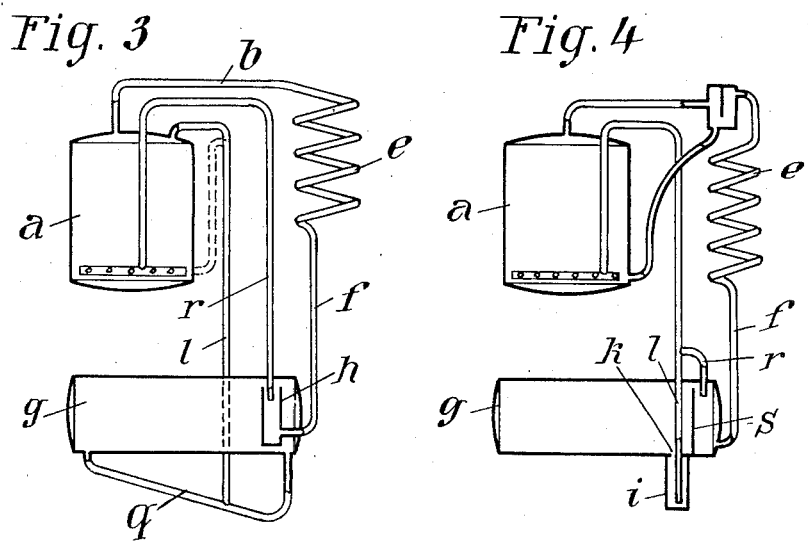
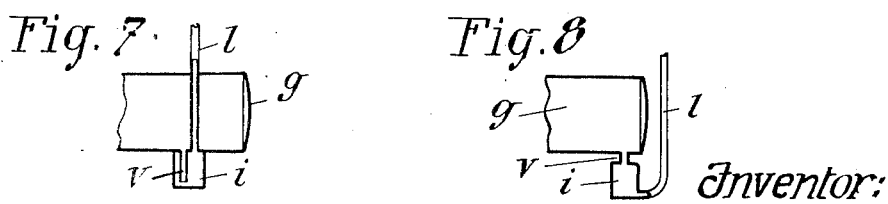

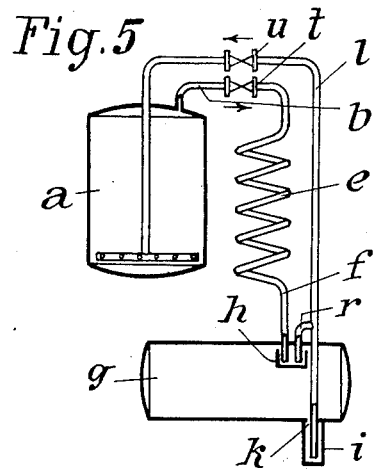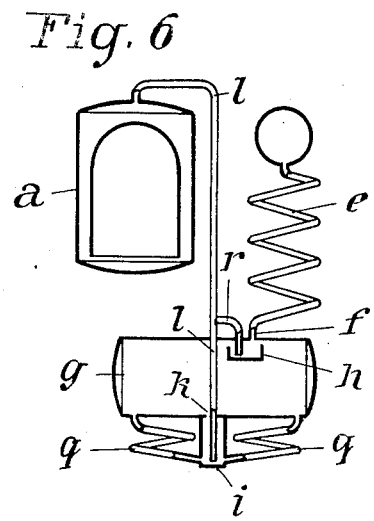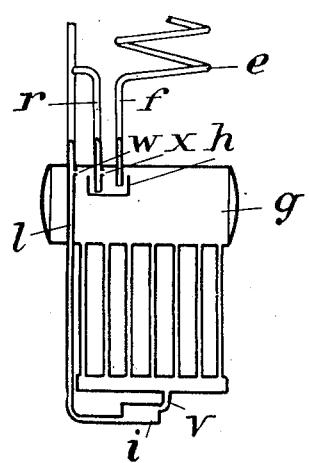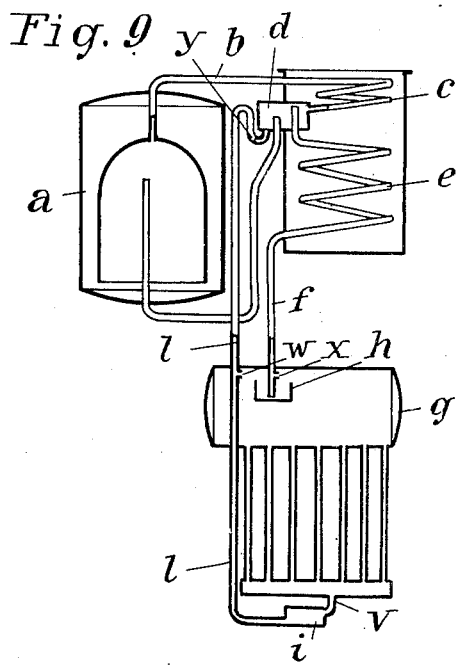

1,697,187

UNITED STATES PATENT OFFICE.

CARL HOCHHERZ, OF AUGSBURG, GERMANY.

ABSORPTION REFRIGERATING APPARATUS.

Application filed December 8, 1925, Serial No. 74,135, and in Germany December 19, 1924.

This invention refers broadly to refrigerating machines and apparatus operating on the principle of the decrease of temperature by the volatilization and the recondensation and absorption of volatile liquids, and it refers in particular to machines of the kind referred with intermittent operation, and it is intended among other important objects to provide means of regulation and control of the absorption and volatilization process by a sealing liquid produced by the refrigerating agent themselves. In the utilization of machines of this kind on a small scale as for instance in connection with refrigerators and the like for household uses and similar purposes, it is of importance to provide for a perfectly automatic operation and regulation of the refrigerator and to dispense with valves and cocks. With these machines and kinds of apparatus there is the difficulty, however, that during the boiling or distilling stage in the case of employment of aqueous solutions of refrigerating fluids water will pass into the evaporator which, with the gradual increase of its quantity, very seriously interferes with the efficiency of the machine. The same will be true, of course, with other difficultly volatilizible constituents of the refrigerating agent. It is an object of my invention to transfer the water which will collect in the course of the operation in the evaporator of the apparatus or, more strictly speaking, the aqueous solution of the refrigerant, such as ammonia, for instance, which will collect in the evaporator back again into the still-absorber automatically at the beginning of each absorption period. By this means the result is produced that with each charging operation of the evaporator a liquid seal is obtained for the communicating pipe or the like carrying the vapors from the evaporator into the absorber, and independently of the particular amount of charge of the evaporator. By this means the further advantage will result that upon the commencement of each absorption stage the suctional pressure of the absorber may be caused to operate simultaneously on this liquid seal and upon the supply of the aqueous solution of the refrigerant which collects in a section of the evaporator. In view thereof, this suctional pressure will be operated to simultaneously aspirate the liquid constituting the liquid seal and the aqueous solution referred to, and as regards the latter this action continues until the sealing liquid for the vapor tube has been removed so that the vapors are free to escape from the evaporator. By the fact that the amount of liquid forming the seal is thus made independent of the rate of charge of the evaporator the contents of the evaporator may be reduced and controlled in connection with the sucking off of the contents thereof preceding the cooling period. By the control of the amount of liquid constituting the seal for the vapor conduit it becomes possible for the operator to exactly determine and adjust the amount to be aspirated which is assumed to be highly charged with water.

It is one of the further objects of my invention to provide means of rendering the operation of the machine and the return of the aqueous solution from the evaporator into the absorber independent of the pipe sections, aspirating levels and the differences of sucking pressures prevailing in the different conduits.

The invention will be more particularly described with reference to the accompanying drawing showing in a diagrammatic manner several exemplifications embodying the principles of my invention in connection with absorption-refrigerating machines in Figs. 1 to 6. Figs. 7 and 8 are two other modifications, particularly showing modified constructions of the collecting section provided on the evaporator for the reception of the aqueous solution of the refrigerant. In Fig. 9 I have shown diagrammatically and in a conventional manner an absorption-refrigerating machine by way of example, in which the transferring of the liquids from the evaporator is produced by the aid of small vapor-admitting openings in the conduits leading off from the evaporator. Fig. 10 is another embodiment of this principle in connection with the aspirating means for the evaporator. The heating and cooling means ordinarily employed with apparatus of this kind being well known, have not been shown on the drawing.

In the machine according to the illustration of Fig. 1 the still absorber comprises a double-walled boiler the interior wall of which is constituted by the interior substantially bell-shaped member. During the heating stage the vapors are admitted from the interior member of this boiler $a$ through the pipe $b$ into the preliminary condenser $c$ and thence into the water-separator $d$ and thence to the main condenser $e$, containing the coil, the end $f$ of which is introduced into the evaporator $g$. This terminal portion $f$ is surrounded by a small cup-shaped reservoir $h$ open towards the evaporator $g$ and which is filled by the condensate from the pipe $f$ and delivers the excess thereof into the evaporator $g$. At the bottom portion of the evaporator a substantially pocket-shaped section $i$ is provided which communicates by a comparatively small opening $k$ with the evaporator $g$. Into this pocket $i$ in which the aqueous solution will collect the pipe $l$ is immersed which leads back into the still absorber $a$, the communication with which may be effected either either by the branch conduit $m$ leading into the bottom portion of the still absorber $a$, or by the communicating pipe $b$ shown in full lines or by the branch pipe $n$ leading into the water separator $d$ from which the vapors may pass through the preliminary condenser $c$ and the pipe $b$ into the still absorber $a$. These various communicating pipes may, if desired, be used alternatingly and may then be provided with suitable regulating means.

At the termination of the heating stage in the apparatus, the condensate from the condenser $e$ has passed into the evaporator $g$, the overflow-cup $h$ having been completely filled by the condensate, so that the lower end of the pipe $f$ has been completely sealed by the liquid. In the pocket $i$ the water or aqueous solution remaining in the evaporator from the previous cooling stage has collected. Inasmuch as the communicating opening $k$ between the pocket $i$ and the evaporator is very small, mixing of the aqueous solution contained in the pocket $i$ with the condensate freshly admitted into the evaporator $g$ is avoided. At the beginning of the absorption the suctional pressure of the still absorber $a$ operates both upon the contents of the pocket $i$ as well as upon the liquid in the cup $h$ and aspirates the liquid from both of them and into the still absorber. This operation continues until the cup $h$ has become empty, whereupon vapors from the evaporator are aspirated through the pipe $f$, so as to commence the cooling stage proper. At the moment at which the pipe $f$ becomes uncovered no more liquid is raised in the pipe $l$. By properly adjusting the pipe sections and the capacity of the cup $h$ the quantity of liquid which has been aspirated and raised from the pocket $i$ may be axactly determined. This dehydration of the evaporator $g$ is automatically effected at the beginning of each absorption period. Only a small quantity of condensate which may be exactly determined in advance, that is to say, the contents of the small cup $h$ is withdrawn from the evaporator and from the cooling stage.

In the exemplification of the invention illustrated in Fig. 2 of the drawing the still absorber comprises a single boiler. The conduit $b$ leads to the water separator $d$ and the condenser is shown at $e$ the pipe end $f$ of which is adapted to be immersed in a small closed receptacle $o$ disposed outside of the evaporator $g$. An overflow pipe $p$ connects the receptacle $o$ with the evaporator $g$. Below the bottom thereof a system of pipes $q$ is provided the two ends of which communicate with the bottom part of the evaporator, so that an aqueous solution may be collected in the pipe system $q$ substantially without any opportunity of becoming mixed with the condensed refrigerant contained in the evaporator $g$. The water-return-conduit $l$ is branched off from the middle portion of the pipe system $q$ and either leads to the water separator $d$ and thence communicates with the still absorber $a$; or the pipe system $q$ may be directly connected by the conduit $l'$ shown in dotted lines with the still absorber $a$. The functioning of this embodiment of the apparatus is the same as set forth with reference to Fig. 1. In both modifications the pipe $f$ serves both for conducting the condensed liquid into the evaporator, as well as conversely for causing the vapors to pass from the evaporator into the still absorber $a$.

In Fig. 3 of the drawing another modified embodiment of the principles of the invention is shown. In this modification the condenser $e$ is connected by the pipe $f$ to the bottom portion of an overflow vessel $h$ mounted in the interior of the evaporator $g$. Into the top portion of this vessel $h$ the vapor discharging pipe $r$ is immersed to a low depth only and conducts the vapors into the still absorber $a$. Underneath the evaporator the pipe system $q$ is provided for the reception of the aqueous solution from which the pipe $l$ leads back to the still absorber $a$ and is connected therewith either at the top or at the bottom. During the heating stage the condensate flows through the pipe $f$ into the cup $h$ completely filling the same and the then succeeding main portion of liquid will overflow into the evaporator $g$. As soon as the cup $h$ has been filled, the foot of the pipe $r$ is sealed, so that at the beginning of the absorption the aspirating pressure will operate in the pipe $l$ as well as in the pipe $r$ and will aspirate the liquid through both pipes until the column of liquid is interrupted in the cup $h$.

Fig. 4 shows another modification in which the overflow space constituting the seal for the vapor discharge pipe $r$ is formed by the arrangement of a partition $s$ in the evaporator $g$. As the collecting means for the water or the aqueous solution from the evaporator a pool or pocket $i$ with small admission opening $k$ is provided similar to the one shown in Fig. 1. In this embodiment the water return pipe $l$ and the vapor-discharge pipe $r$ are connected into a single pipe.

In the further modified exemplification according to Fig. 5 of the drawing check valves $u$, $t$ may be provided in the pipe conduits to regulate and to direct the vapors in the well known manner. The pipe conduit $b$ leading from the still absorber $a$ to the condenser $e$ contains a check valve $t$ which opens in the direction of the condenser $e$, while the return conduit $r$, $l$ for the vapors and the water contains the check valve $u$ opening in the direction of the still absorber $a$. In the heating period the conduit $l$ is closed by the valve $u$ and the vapors are free to pass from the still absorber $a$ by way of the valve $t$ to the condenser $e$ and thence through the pipe $f$ into the cup $h$ and into the evaporator $g$. At the beginning of the absorption stage the valve $t$ is closed by suction and the valve $u$ is opened. Liquid will thereby be raised by suction from the cup $h$ and the pocket $i$, until the cup $h$ has been emptied so that vapors will then flow through the pipe $r$ which are then conducted to the pipe $l$ and by way of the valve $u$ into the still absorber $a$.

In accordance with the exemplification illustrated in Fig. 6 of the drawing, the condenser $e$, instead of being situated between the still absorber $a$ and the evaporator $g$, as in the other exemplifications, is so arranged that the evaporator $g$ is disposed between the still absorber $a$ and the condenser $e$. The still absorber $a$ in this modification may, for instance, comprise a double-walled boiler with bell-shaped interior member. In the heating period the vapors pass from the absorber through the water return pipe $l$ and the vapor branch $r$ into the evaporator $g$ and they thence flow through the pipe $f$ which terminates in the wall of the evaporator $g$ into the condenser $e$. Underneath the openings of the pipes $r$ and $f$ the cup $h$ is disposed in the condenser in such a manner that the pipe $r$ is immersed in the cup $h$, while the pipe $f$ terminates above the same. The water collecting member of the evaporator $g$ in this exemplification comprises the combination of a pocket or water pool $i$ with a pair of pipe systems $q$, the water pool $i$ with the pipe $l$ immersed therein being preferably arranged in the middle part of the pipe system $q$. The condensate which flows from the condenser $e$ through the pipe $f$ and into the evaporator $g$ will first completely fill the cup $h$, thereby sealing the vapor pipe $r$. Upon the beginning of the absorption the aspirating pressure by way of the pipe $l$ will operate upon the contents of the pocket $i$ and the cup $h$, until the column of liquid in the cup $h$ is interrupted, so that only vapors can pass into the pipe $l$, which initiates the cooling stage.

The water collecting member $i$ which in all modifications is constructed in the manner of communicating pipes, instead of comprising separate telescopingly inserted pipes, may also assume the shape shown diagrammatically in Figs. 7 and 8 of the drawing. The evaporator $g$ according to Fig. 7 is again provided with the pocket-like projection $i$ communicating with the evaporator by the small pipe $v$ which extends almost clear to the bottom of the projection. The water return pipe $l$ terminates at the top of the projection $i$. A somewhat reversed relative arrangement of the parts in connection with the water collecting member is shown in Fig. 8. In this exemplification the small communicating pipe $v$ leads from the evaporator into the top of the water collector $i$ and the water return pipe $l$ extends into the bottom of the said receptacle $i$ disposed below the evaporator $g$.

In the different exemplifications of the apparatus according to this invention hereinbefore described the sectional areas of the pipe conduits and the lengths of the conduits and other conditions should be adjusted with relation to each other, so as to insure the desired action and highest efficiency thereof, even with varying specific gravities of the quantities of liquid to be sucked off from the evaporator $g$. The same result, however, may be accomplished by constructing the machine substantially in accordance with the embodiments shown diagrammatically in Figs. 9 and 10 of the drawing. In the embodiment according to Fig. 9 the pipe conduit $l$ for the return of the aqueous solution from the collector $i$ is carried through the evaporator $g$, and it is provided with a small lateral opening $w$ within the evaporator and above the highest level of liquid therein and within the vapor space of the same. The conduit $f$ for the return of the vapors which is immersed in the evaporator $g$ and into the overflow cup $h$, is likewise provided with a small opening $x$ above the highest level of the liquid in the evaporator $g$. The top end of the conduit $l$ is connected by a curved or trap-like portion $y$ to the water separator $d$, so that a liquid seal is formed in the path of the vapors during the heating period in this curved section y, so as to prevent the vapors during the heating stage from passing through the conduit l and the small opening w into the evaporator g.

The mode of operation of the apparatus in accordance with this modification is substantially the same as described with reference to the apparatus shown in Figs. 1 to 6. The regularity of operation is, however, insured by the openings w and x under all conditions, and particularly with varying specific gravities of the liquid to be aspirated. Through these small openings some of the vapors are also free to enter into the conduits l and f. The high aspirating pressure produced in the still absorber at the beginning of the absorption period, however, does not only operate through the small openings w and x, so that liquid will be raised from the bottom and above the small openings w and x mixtures of liquid and vapors are produced in the conduits l and f the weights of which will automatically balance each other. Thus, if for instance a greater quantity of liquid is raised in the pipe l, so that in this pipe the weight of the column of liquid is greater than the weight of the column in the pipe f, the column in the pipe l will somewhat lag behind the column in the pipe f. In consequence thereof, the aspirating action in the pipe f is increased and inasmuch as this sucking action cannot be fully compensated merely by the very small opening x, liquid will be aspirated from the cup h, until the pressure will be compensated with relation to the pipe l, and the raising of the column of liquid in this pipe l will then be continued. Such compensating actions are mutually produced in the two pipes l and f. As a result thereof the liquid contained in the cup h is sucked off and the aqueous solution from the collecting member i is likewise discharged until the lower opening of the pipe f becomes exposed. Vapors will then enter into the lower opening of the pipe f and the further raising of the liquid in the pipe l is arrested.

The emptying of the overflow receptacle h may also be effected by the pipe l by means of a branch pipe r, as has been indicated with reference to Figs. 4, 5 and 6 of the drawing. In the kind of apparatus according to this modification, the small opening x is provided in this branch pipe r, as shown in Fig. 10 of the drawing, and by this means the vapors may be passed into the still absorber during the cooling period either through the pipe r and the pipe l, or by way of the pipe f and the condenser e. If, for instance, the pipe f is immersed into the cup h to a lesser depth than the pipe r, the sucking off of the content of the cup h will first expose the pipe f and the vapors will flow back to the pipe f and the condenser e into the still absorber a. In the case of both pipes r and f being immersed to the same depth into the overflow cup h, they will become exposed simultaneously and the vapors are free to pass through both pipes. If, on the other hand, the pipe f extends to a greater depth in the cup h than the pipe r, the sucking off of the liquid from the cup h will first uncover the pipe r and the vapors will pass through the same and the conduit l into the still absorber a.

While I have shown the invention by way of illustration of its principles as exemplified in some embodiments which I have found to be particularly advantageous, it should be understood that it is not restricted thereto and it may find expression in other forms of embodiment to suit varying conditions of application and without thereby deviating from the scope and spirit of the invention as more particularly set forth in the appended claims.

I claim:—

1. In a refrigerating apparatus the combination with a still-absorber and an evaporator spaced therefrom and communicating therewith, of a liquid seal at the bottom of the evaporator intermediate the evaporator and the communicating means with the absorber, an additional liquid seal in the upper part of the evaporator and communicating with the vapor space thereof, and a condensing conduit leading from said additional liquid seal to the still-absorber.

2. In a refrigerating apparatus in combination, a still absorber, a closed evaporator spaced therefrom, a condenser intermediate the still-absorber and the evaporator, a liquid seal communicating with the vapor space of said evaporator, means connecting the liquid seal to the condenser, an additional liquid seal at the bottom of the evaporator, means establishing communication of said additional liquid seal with the condenser, a water-separator inserted on said condenser, and communicating means between the condenser and the still-absorber.

3. In a refrigerator, a still-absorber for heating liquid, an evaporator for the reception of the condensate from said liquid, a liquid-collecting member, projecting from the bottom of the evaporator, constricted communicating means connecting the collecting member to the evaporator, and communicating means between the absorber and the evaporator respectively connected with the vapor space of the evaporator and with the collecting member and condensing means for the evaporated refrigerant on the last-mentioned communicating means and connected therewith.

4. In a refrigerator, a still-absorber for heating liquid, an evaporator for the reception of the condensate from said liquid, a liquid-collecting member, projecting from the bottom of the evaporator, communicating means between the absorber and the evaporator respectively connected with the vapor space of the evaporator and with the collecting member, condensing means for the vapors connected with the vapor space of the evaporator, and a liquid-trap on the evaporator, communicating with the vapor space thereof and with the condensing means and with the communicating means leading from the bottom of the evaporator and connecting said communicating means last mentioned to the condenser and pipe connection between the condenser and the absorber.

5. In a refrigerator, a still-absorber for heating liquid, an evaporator for the reception of the condensate from said liquid, a liquid-collecting member projecting from the bottom of the evaporator, constricted communicating means between said collecting member and the evaporator, a sealing reservoir communicating with the vapor space of the evaporator and adapted for the reception of condensed liquid, condensing means for the vapors connected to the sealing reservoir, and communicating means between the absorber and the evaporator and respectively inserted in the sealing reservoir and in the collecting member.

6. In a refrigerator, a still-absorber for vaporizing liquid, an evaporator for the reception of the condensate from said liquid, a liquid-collecting member projecting from the bottom of the evaporator, constricted communicating means between said collecting member and the evaporator, a sealing reservoir communicating with the vapor space of the evaporator and adapted for the reception of condensed liquid resulting from vaporization and condensation, condensing means for the vapors, a communicating conduit connected to the condensing means and immersed in the sealing reservoir and a communicating conduit connecting the collecting member to the absorber and communicating means on said conduits extending into the vapor space of the evaporator.

7. In a refrigerator, a still-absorber for vaporizing liquid, an evaporator for the reception of the condensate from said liquid, a liquid-collecting member projecting from the bottom of the evaporator, throttling means on said member adjacent the evaporator, a sealing reservoir communicating with the vapor space of the evaporator and adapted for the reception of condensed liquid, condensing means for the vapors, communicating with the absorber, a conduit leading from the condensing means and immersed in the sealing reservoir, an additional conduit between the collecting member and the condensing means, a liquid-trap on said additional conduit, and communicating means on said conduits extending therefrom into the vapor space of the evaporator.

8. In a refrigerator, a still-absorber for vaporizing liquid, an evaporator for the reception of the condensate from said liquid, a liquid-collecting member at the bottom of the evaporator, a communicating conduit inserted in said collecting member and connected to the absorber, an additional communicating conduit between the absorber and the vapor space of the evaporator, a liquid seal communicating with said vapor space and surrounding the open end of the last-mentioned conduit and condensing means for the vapors communicating with the liquid seal.

9. In a refrigerator, a still-absorber for vaporizing liquid, an evaporator for the reception of the condensate from said liquid, a liquid-collecting member at the bottom of the evaporator, a communicating conduit inserted in said collecting member and passing through the evaporator and communicating with the absorber, an additional communicating conduit between the absorber and the vapor space of the evaporator, a liquid seal communicating with said vapor space and surrounding the open end of the last-mentioned conduit and condensing means for the vapor communicating with the liquid seal and the absorber.

10. In a refrigerator, a still-absorber for vaporizing liquid, an evaporator for the reception of the condensate from said liquid, a liquid-collecting member at the bottom of the evaporator, a communicating conduit inserted in said collecting member and connected to the absorber, an additional communicating conduit between the absorber and the vapor space of the evaporator, a sealing reservoir communicating with the vapor space of the evaporator and surrounding the open end of the last-mentioned conduit, condensing means for the vapor communicating with the last-mentioned conduit, and substantially constricted communicating means on said conduits respectively opening in the vapor space of the evaporator.

11. In a refrigerator, a still-absorber for vaporizing liquid, an evaporator for the reception of the condensate from said liquid, a liquid-collecting member at the bottom of the evaporator, a communicating conduit inserted in said collecting member and connected to the absorber, an additional communicating conduit between the absorber and the vapor space of the evaporator, a sealing reservoir communicating with the vapor space of the evaporator and surrounding the open end of the last-mentioned conduit, condensing means for the vapor communicating with the last-mentioned conduit, and additional communicating means between the vapor space of the evaporator and the conduit leading from the collecting means to the absorber.

12. In a refrigerator, a still-absorber for heating liquid, an evaporator for the reception of the condensate from said liquid, condensing means for the vapors, a liquid trap connected to said condensing means and the vapor space of the evaporator, a liquid collecting member at the bottom of the evaporator and communicating means between the absorber and the evaporator respectively connected to the liquid trap and to the collecting member.

In testimony whereof I affix my signature.

CARL HOCHHERZ.